(No Model.)
C. G. CONN.
DRUM TIGHTENER.
No. 367,701. Patented Aug. 2, 1887.
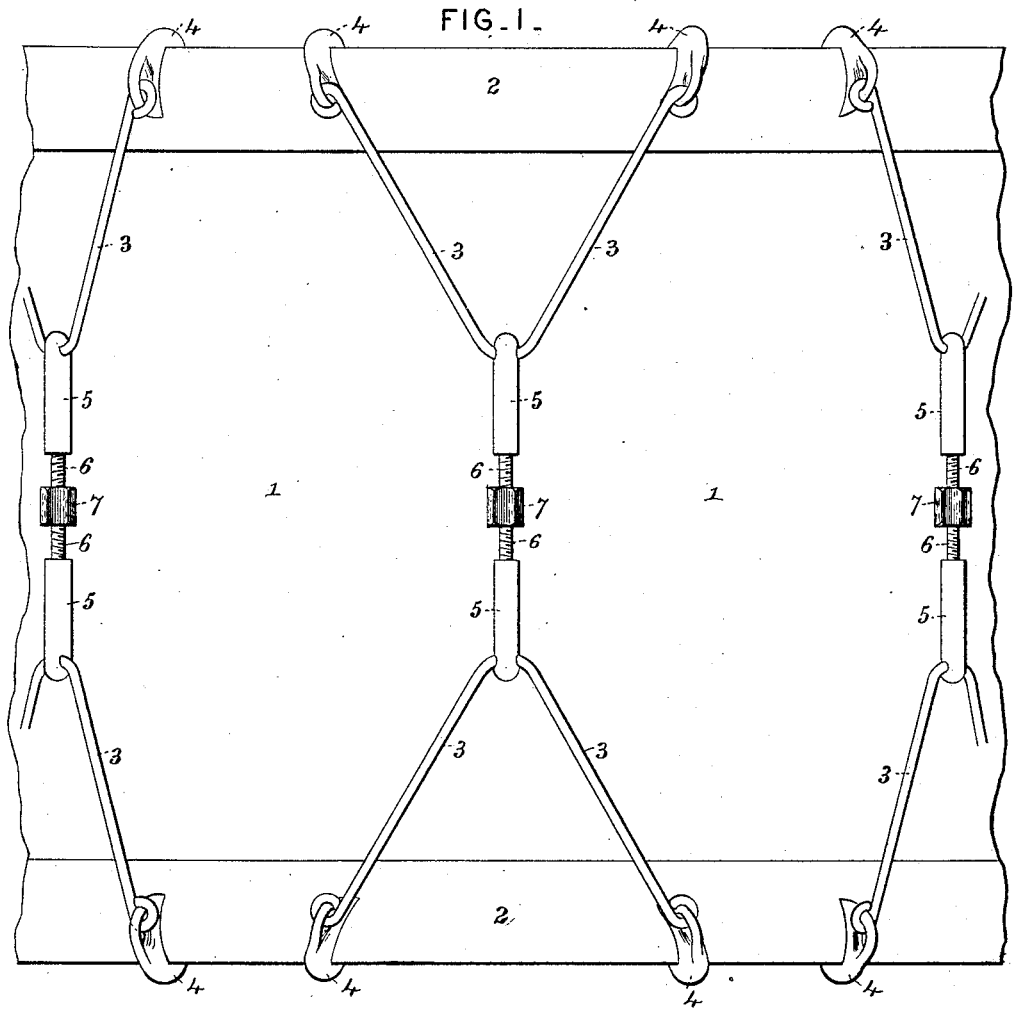
FIG. I.
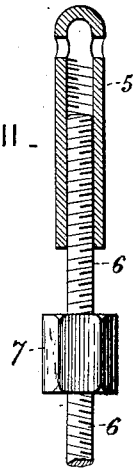
FIG. II.
Attest:
Geo. T. Smallwood.
Walter Allen
Inventor:
Charles G. Conn.
By Knight Bros
Attys

UNITED STATES PATENT OFFICE.

CHARLES G. CONN, OF ELKHART, INDIANA.

DRUM-TIGHTENER.

SPECIFICATION forming part of Letters Patent No. 367,701, dated August 2, 1887.

Application filed October 30, 1886. Serial No. 217,606. (No model.)

*To all whom it may concern:*

Be it known that I, CHARLES G. CONN, of Elkhart, in the county of Elkhart and State of Indiana, have invented an Improvement in Drum-Tighteners, of which the following is a specification.

My invention relates to an improvement on that form of drum-tightener for which Letters Patent No. 353,204 were granted to me on the 23d of November, 1886, and which improvement consists in a tightener for drum-heads, comprising a pair of V-shaped cords or wires having hooks at their ends, and a screw-rod and socket-pieces forming an adjustable connection between the middle portions of the cords or wires, substantially as hereinafter described.

My improvement consists, further, in a tightener for drum-heads, comprising a pair of V-shaped cords or wires having hooks at their ends and provided with nuts or socket-pieces at their middle portions, and a short right-and-left screw-rod for connecting the nuts or socket-pieces, substantially as hereinafter described.

By the use of V-shaped strainers on both ends of the tightening-rods, instead of a single V-shaped strainer at one end, I am enabled to strain both heads evenly with just half the number of rods used in the old style of drum. When I use only one of the V-strainers to tighten the batter-head, as shown in my patent referred to, I am unable to give an even strain on the snare-head, for the reason that the snare-head has only one hook, where the batter-head has two hooks. I find that most drummers want the heads strained evenly, and by the use of the V-strainer on each end of the screw-rod I am able to give the drum a more perfect and satisfactory strain.

In order that my invention may be more fully understood, I will proceed to describe it with reference to the accompanying drawings, in which—

Figure I is a side elevation of a portion of a drum having my improved tightener applied thereto. Fig. II is a detail view, showing the connection between the end of a right-and-left screw-rod and the middle portion of a cord or wire.

1 is a portion of a drum-body, and 2 is a portion of a drum-rim or drum-hoop.

3 are V-shaped cords or wires having hooks 4 secured to the ends thereof, and provided with interiorly screw-threaded socket-pieces or nuts at their central portions. The hooks are adapted, as usual, to fit the rim or hoop, and the socket-pieces or nuts are provided for the purpose of furnishing means by which a short right-and-left screw-rod, 6, having a burr, 7, to provide means for adjusting it, may be employed for coupling the socket-pieces or nuts of each pair of connections.

Having thus described my invention, what I claim as new therein, and desire to secure by Letters Patent, is—

1. A tightener for drum-heads, comprising a pair of V-shaped cords or wires, 3 3, having hooks 4 4 at their ends for engaging the drum hoops or rims, and socket-pieces at their middle portions, and a screw-rod connecting the socket-pieces, substantially as described and shown.

2. A tightener for drum-heads, comprising a pair of V-shaped cords or wires, 3 3, having hooks 4 4 at their ends for engaging the drum hoops or rims, and provided with nuts or socket-pieces 5 5 at their middle portions, and a short right-and-left screw-rod, 6, connecting the nuts or socket-pieces, substantially as described and shown.

CHARLES G. CONN.

Witnesses:
  E. C. BICKEL,
  H. B. SHERWOOD.